United States Patent [19]

Matsumura

[11] Patent Number: 5,114,150
[45] Date of Patent: May 19, 1992

[54] GOLF SWING ANALYZER

[76] Inventor: Yukinobu Matsumura, 746, Honmachi, Shoubara-shi, Hiroshima, Japan

[21] Appl. No.: 700,302

[22] Filed: May 8, 1991

Related U.S. Application Data

[63] Continuation of Ser. No. 417,544, Oct. 4, 1989, abandoned.

[30] Foreign Application Priority Data

Oct. 18, 1988 [JP] Japan .................. 63-261747

[51] Int. Cl.⁵ .............................................. A63B 69/36
[52] U.S. Cl. ........................... 273/186 R; 273/183 R; 273/186 A; 273/186 C
[58] Field of Search .......... 273/183 R, 183 A, 183 D, 273/184 R, 185 R, 185 A, 186 R, 186 A, 186 B, 186 C, 186 D, 195 R; 434/252

[56] References Cited

U.S. PATENT DOCUMENTS

| | | | |
|---|---|---|---|
| 4,180,726 | 12/1979 | Decrescent | 273/185 R |
| 4,254,956 | 3/1981 | Rusnak | 273/181 H |
| 4,477,079 | 10/1984 | White | 273/186 R |
| 4,615,525 | 10/1986 | Yasuda et al. | 273/183 A |
| 4,979,745 | 12/1990 | Kobayashi | 273/186 R |

FOREIGN PATENT DOCUMENTS

| | | | |
|---|---|---|---|
| 43-16082 | 7/1968 | Japan | 273/185 R |
| 2110939 | 6/1983 | United Kingdom . | |
| 2135199 | 8/1984 | United Kingdom | 273/186 R |
| 2150841 | 7/1985 | United Kingdom | 273/186 R |

Primary Examiner—William H. Grieb
Assistant Examiner—Jessica Harrison
Attorney, Agent, or Firm—Oblon, Spivak, McClelland, Maier & Neustadt

[57] ABSTRACT

A golf swing analyzer having two sensors which are adapted to sense the swing of a golf club, wherein analysis is made by detecting crossing points of the output signal waveforms at which the waveforms intersect a reference potential level plus and minus a predetermined value. The golf swing analyzer takes accurate measurement of the speed and/or direction of the swing without being affected by a noise.

4 Claims, 3 Drawing Sheets

GOLF SWING ANALYZER

This application is a continuation of application Ser. No. 07/417,544, filed on Oct. 4, 1989, now abandoned.

BACKGROUND OF THE INVENTION

The present invention relates to a golf training machine and more particularly to a golf swing analyzer for taking an accurate measurement of the swing speed of a golf club and/or for analyzing the swing direction of the golf club. In the conventional swing analyzers, analysis of the swing is effected by detecting points of the output waveforms from sensors at which the waveforms cross a reference potential level, and such analyzers are susceptible to a noise. False operations due to such noise often occur. Then, detection at other different points than the zero crossing of the waveforms so as to get rid of the effects of noise makes it difficult to take correct and exact measurement of speed. Further, the conventional analyzers need at least three separate sensors in order to check the swinging direction.

SUMMARY OF THE INVENTION

In view of the above-mentioned problems, it is a primary object of the present invention to provide an improved swing analyzer that is not affected by noise in its operation.

It is another object of the present invention to provide a swing analyzer that takes exact measurement of speed.

It is still another object to provide a compact and simple-in-construction swing analyzer.

According to the present invention, a swing analyzer is provided with two sensors which provide signals by sensing the movement of a golf club and two pairs of detectors which detect whether the output signals of the sensors are larger or smaller than a reference potential level Vo plus a predetermined value a. Then, analysis is made by measuring a time interval between two points of the output signal waveforms which intersect to Vo+a level and a time interval between two points of the output signal waveforms which intersect the Vo−a level. The features and advantages of the present invention may be best understood by making reference to the following description taken in connection with the accompanying drawing.

DESCRIPTION OF THE PREFERRED EMBODIMENT

Figure 1:
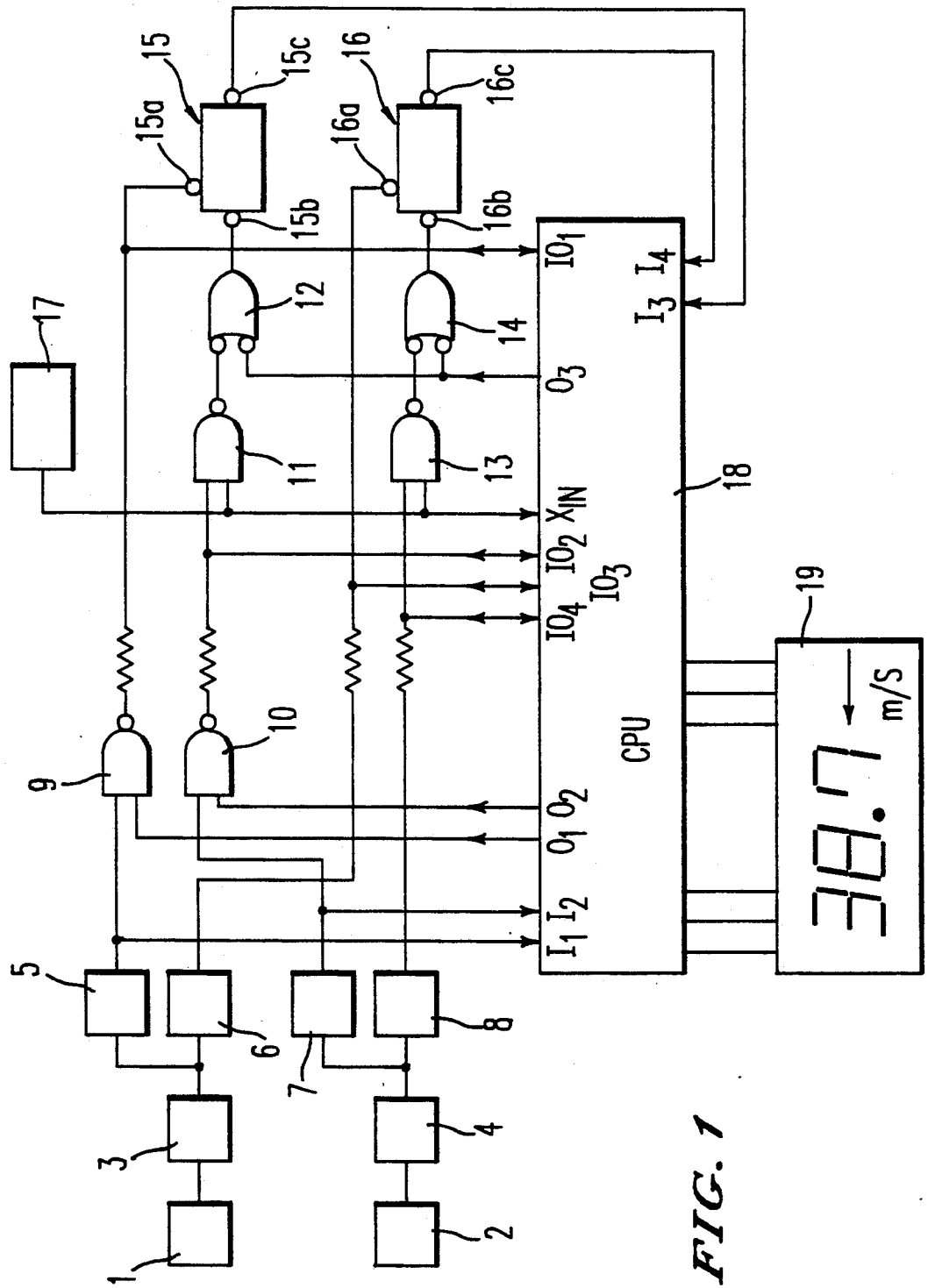
FIG. 1 is a block diagram showing the construction of the control circuitry employed in a preferred embodiment of the swing analyzer according to the present invention.
Figure 2:
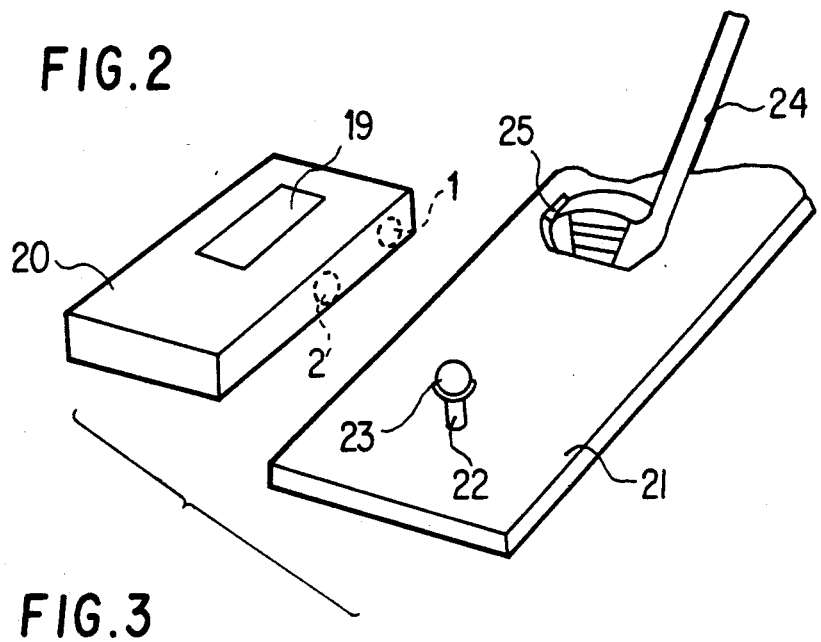
FIG. 2 illustrates how to use the swing analyzer according to the invention.

Referring now collectively to the drawings and more particularly to FIGS. 1 and 2 at first, a golf swing analyzer according to the present invention is generally shown by 20. The body 20 is provided with an indicator 19, a first sensor 1 and a second sensor 2. The indicator 19 is formed on the top side of the body 20 and displays the results of analysis in connection with the swing motion of a golf club 24. The first and second sensors 1 and 2 are mounted on the lateral side facing a golf player (not shown) who swings the golf club 24. These two sensors are arranged in horizontally spaced relationship with each other. The distance between the sensors can be in the range of 1 to 20 cm. But, the 3 to 12 cm distance is preferable so as to catch the movement of the club head in an arc accurately while maintaining the body 20 compact. In this embodiment, magnetic sensors are used, and the golf club has a permanent magnet 25 which is attached on the head portion in such a manner as shown in FIG. 2. Spread in front of the body 20 is a mat 21 and a tee 22 for placing a golf ball 23 thereon is arranged on the mat 21. The mat 21 and the tee 22 are not necessarily used for analyzing the swing motion. It is important to note that, in order to ensure the accurate measurement of the head speed, the measurement must be taken before the head of the golf club 24 impacts on the golf ball 23 because upon impact the swing speed of the golf club 24 is reduced, and, accordingly, the golf ball 23 should not be placed within the region between the sensors 1 and 2.

In FIG. 1, there is illustrated the construction of the control circuitry employed in the embodiment of the present invention. The above-mentioned first and second sensors 1 and 2 are respectively connected to amplifiers 3 and 4. Amplified signals are supplied to detectors 5, 6, 7 and 8, and here the signals are compared with the predetermined Vo+a level and the predetermined Vo−a level. The value a is fixed in accordance with the amplification rate of the amplifiers 3 and 4. As described in detail herein- after, the control circuitry further comprises gate circuits 9, 10, 11, 12, 13 and 14. The reference numerals 15 and 16 are counters; 17 an oscillator and 18 a central processing unit (CPU), respectively.

Figure 3:
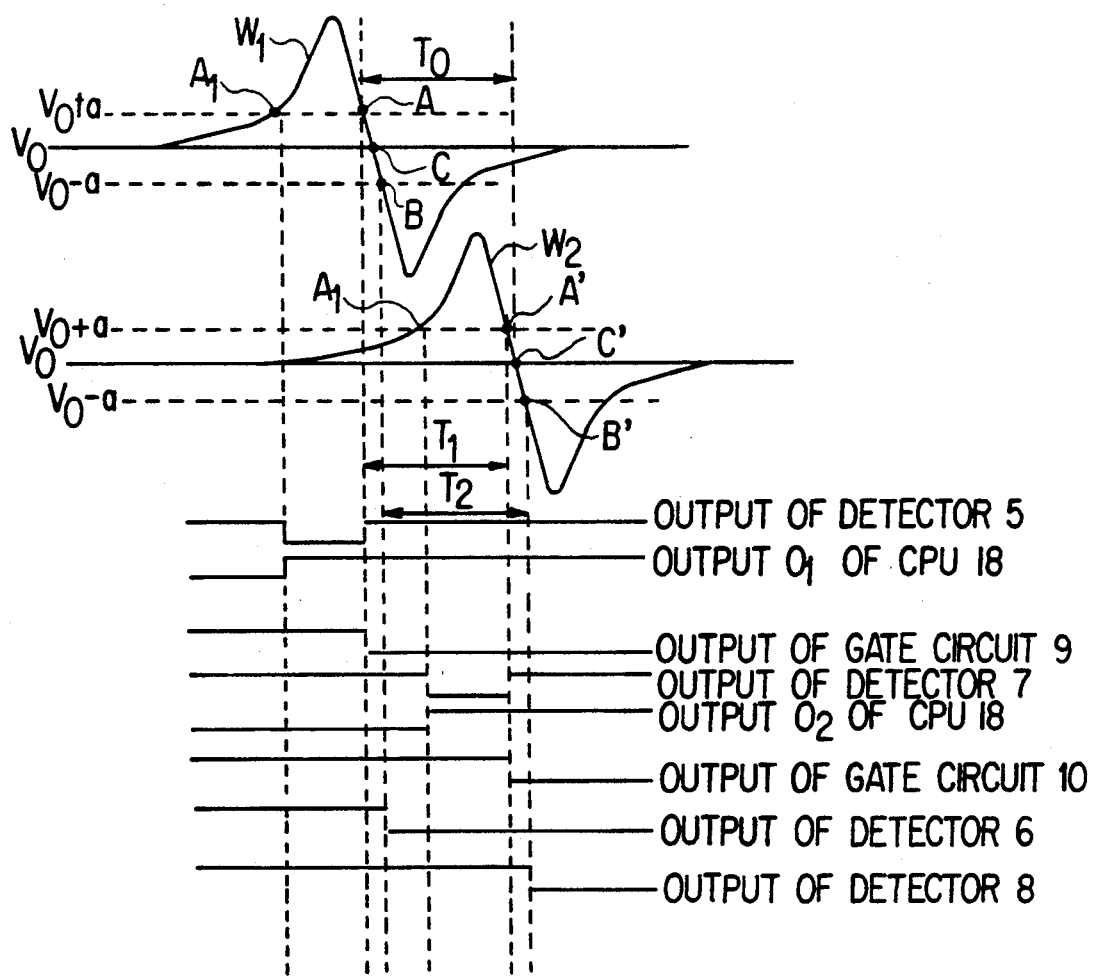
FIG. 3 illustrates signal waveforms of sensors with a timing chart of output signals at various parts of the control circuitry shown in FIG. 1.

When the golf club 24 with the magnet 25 is swung in front of these two sensors 1 and 2 in the direction shown by an arrow in FIG. 2, at first the first sensor 1 and then the second sensor 2 produce signals respectively, as the magnet 25 passes the central axis of each sensor. The produced signals are amplified by the amplifiers 3 and 4. FIG. 3 shows a waveform W1 of the signal which is amplified by the amplifier 3, and a waveform W2 of the signal amplified by the amplifier 4. The waveform W1 crosses a reference potential level Vo at C, and it shows that at this instant C the magnet 25 mounted on the head of the golf club 24 has passed the central axis of the sensor 1. The waveform W2 crosses the reference potential level Vo at C' and it shows that at this instant C' the magnet 25 has passed the central axis of the sensor 2. Accordingly, the reference To indicating the length from C to C' shows the time interval in which the magnet 25 has moved from the center of the sensor 1 to the center of the sensor 2. Thus, it is known that the speed of the swinging golf club head can be calculated by dividing a distance X between the sensor 1 and the sensor 2 by To. The conventional analyzers measure time by detecting the crossing signals at C and C'. However, it causes false operations. This is because noise appears along the reference potential level Vo and the above-mentioned C and C' are also the crossing points on the reference potential level Vo.

Figure 4:
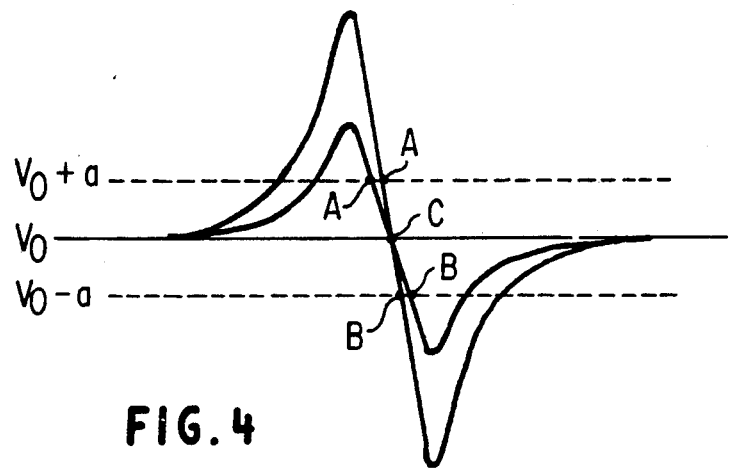
FIG. 4 illustrates changes in the waveforms in response to change in distance between a permanent magnet attached on a golf club and magnetic sensors.
Figures 5A, 5B:
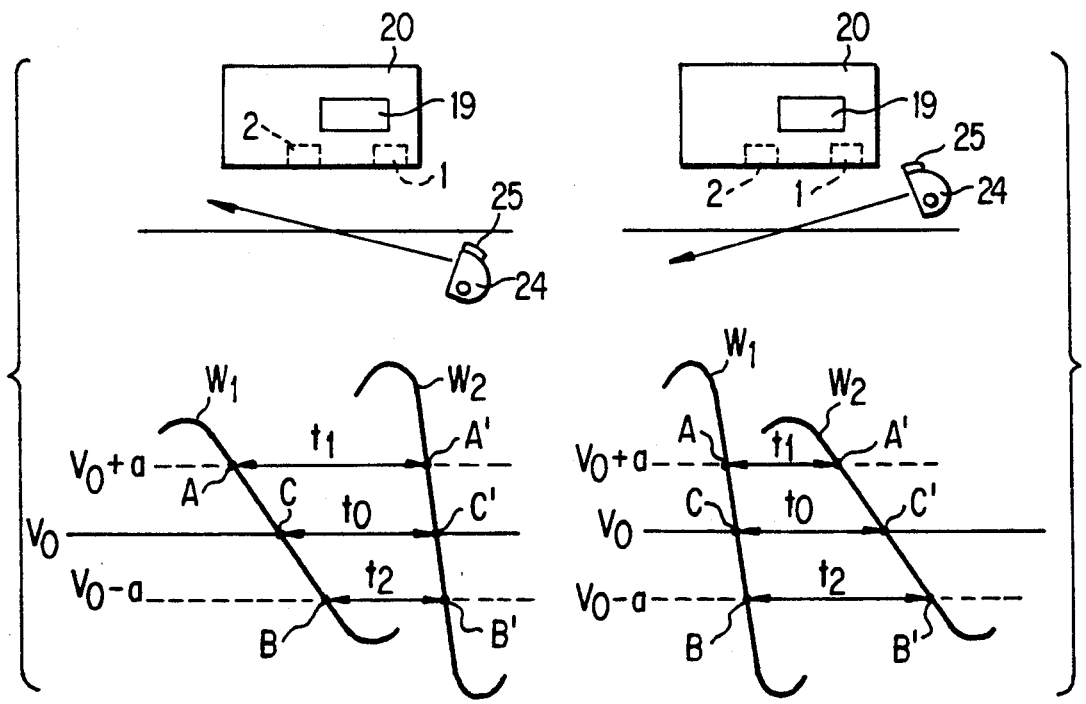
FIG. 5(a) shows waveforms of the output signals of the sensors when the golf club swing is inside-out to ideal.
FIG. 5(b) shows waveforms of the output signals from the sensors when the golf club swing is outside-in to ideal.

In the golf swing analyzer according to the present invention, the speed of the swinging golf club is determined by measuring both T1 and T2 as illustrated in FIG. 3. Namely, T1 is the time interval between a point A of the waveform W1 which is higher than the reference potential level Vo by +a and a point A' of the waveform W2 which is higher than the reference potential level Vo by +a, while T2 is the time interval between a point B of the waveform W1 which is lower than the reference potential level Vo by −a and a point B' of the waveform W2 which is lower than the reference potential level Vo by −a. When the waveforms W1 and W2 are equal, To=T1=T2. However, the magnitude of the waveform varies in proportion to the distance between the sensor and the magnet 25 which has passed by the sensor. If one of the distances is smaller, the waveform of the output signal from the closer sensor is larger than that of the other sensor. To the contrary, the waveform of the the output signal from the sensor at a longer distance becomes smaller. FIG. 4 shows the comparison between a large waveform and a small waveform. As seen, the points at which each waveform intersects the reference potential level Vo are constant at C irrespective of the magnitude of the waveform. To the contrary, the points A and B change in accordance with the magnitude of the waveform. The description about these are made in detail with reference to FIGS. 5(a) and (b). The swing shown in FIG. 5(a) is in the "inside-out" direction, and the swing in FIG. 5(b) is in the "outside-in" direction. If the golf club is swung as shown in FIG. 5(a), the distance between the sensor 1 and the magnet 25 is greater than the distance between the sensor 2 and the magnet 25, when measured at the instant of passing the center of each of the sensors 1 and 2. Therefore, the waveform W1 of the output signal from the sensor 1 becomes smaller than the waveform W2 of the output signal from the sensor 2. As shown, the time interval T1 between the points A and A' becomes longer than the time interval To during which the golf club 24 has actually crossed the central axes of the sensors 1 and 2. On the other hand, the time interval T2 between the points B and B' becomes shorter than the time interval To. Thus, T1 and T2 change in accordance with the magnitude of each waveform, but there is no change in the following relation: To=(T1+T2)/2. In view of this, the component of speed parallel to a line through the two sensors of the golf club 24 can be calculated by dividing the distance between the sensors 1 and 2 by (T1+T2)/2. These apply also to the swing direction as shown in FIG. 5(b).

As mentioned above, both T1 and T2 are measured, and with these it can be determined whether the golf club 24 has been swung in the desired direction correctly. In FIGS. 5(a) and 5(b), if T1 is larger than T2, it shows that the swing is in the "inside-out" direction, and if T1 is smaller than T2, it shows that the swing is in the "outside-in" direction. Thus, the correct swing of the golf club 24 in the desired direction can be determined by detecting whether T1 is equal to T2. In an actual application, such correct judgement should be made by $|T1-T2|<K$, where K is a certain practical value. If K is small, judgement on the correct swing becomes strict. If K is large, it becomes less strict. Thus, any arbitrary range can be set in accordance with the practical requirements. The allowable range of the "inside-out" swing as shown in FIG. 5(a) can be different from that of the "outside-in" swing as shown in FIG. 5(b). Further, angles of deviation can be calculated based on T1 and T2. T1 and T2 correspond respectively to the value obtained by dividing the counts of the counters 15 and 16 by the oscillation frequency of the oscillator 17. Therefore, whether the golf club 24 has been swung correctly in the desired direction can also be judged by finding whether the counts are beyond or below a predetermined value.

Here, how to obtain T1 and T2 will be described with reference to FIGS. 1, 2 and 3. At first, the output signal of the sensor 1 is amplified by the amplifier 3, as described hereinabove, the detector 5 detects whether the waveform W1 of the amplified signal from the sensor 1 is larger than Vo+a, while the detector 6 detects whether the same waveform W1 is larger than Vo−a. Similarly, the detector 7 detects whether the waveform W2 of the amplified signal from the sensor 2 is larger than Vo+a, and the detector 8 detects whether the same waveform W2 is larger than Vo−a. In the embodiment, the output of each of the detectors 5, 6, 7 and 8 is set in the "high" level, and, for example, one of the inputs of the gate circuit 9 is normally in the "high" level as it is connected to the detector 5. The other input of the gate circuit 9 is connected to an output O1 of the CPU 18 and is set in the "low" level. The output of the gate circuit 9 is normally in the "high" level, and therefore a reset terminal 15a of the counter 15 is also "high" and in the state of reset. In the same way, the output of the gate circuit 10 is in the "high" level, as an output O2 of the CPU 18 is set in the "low" level. Accordingly, the gate circuit 11 produces pulse signals corresponding to the number of the pulse signals of the oscillator 17. One of the inputs of the gate circuit 12 is connected to an output O3 of the CPU 18 which is normally in the "high" level and the output pulse signals of the gate circuit 12 are fed to an input 15b of the counter 15. However, when the counter 15 receives the pulse signals, the counter 15 is in the state of reset and does not count the number of the pulses. In the same manner, a reset terminal 16a of the counter 16 is "high" in the state of reset and the counter 16 does not count the number of the pulses supplied. Here, when the magnet 25 has passed by the sensor 1, the sensor 1 generates a signal which is to be amplified by the amplifier 3. At a point A1 of the waveform W1 of the amplified signal which is beyond Vo+a, the output of the detector 5 becomes low. In response to this, the CPU 18 detects the change with its input I1 and changes its output O1 to "high". Then, the waveform W1 goes below Vo+a at the point of A, and the output of the detector 5 returns to "high". As a result, the output of the gate circuit 9 becomes "low", the reset terminal 15a of the counter 15 changes to the "low" level, the state of reset is released, and the counter 15 starts counting. At the point B of the waveform W1 which goes below Vo−a, the output of the detector 6 becomes "low", and the state of reset is released, and then the counter 16 also starts counting.

When the magnet 25 has passed by the sensor 2, the sensor 2 generates a signal which is to be amplified by the amplifier 4. At the point A1 of the waveform W2 going beyond Vo+a, the output of the detector 7 becomes "low". The CPU detects this change with its input I2 and makes its output O2 "high". Then, at the point A' of the same waveform W2, it goes below Vo+a, and the output of the detector 7 returns to "high". As a result, the output of the gate circuit 10 becomes "low", the output of the gate circuit 11 becomes "high", and the supply of the pulse signals to the input 15b of the counter 15 stops. Thus, the counter 15 stops counting. Likewise, at the point B' of the waveform W2 going below Vo−a, the output of the detector 8 goes "low", and the output of the gate circuit 13 becomes "high". As a result, the counter 16 stops counting as the pulse signals are not supplied to an input 16B of the counter 16. In this way, the counter 15 starts counting at the point A of the waveform W1 and stops counting at the point A' of the waveform W2. Therefore, T1 can be obtained by dividing the counts of the counter 15 by the frequency of the oscillator 17. T2 is obtained by dividing the counts of the counter 16 by the frequency of the oscillator 17.

In the embodiment, the counters 15 and 16 are separately provided in addition to the CPU 18, and overflow terminals 15c and 16c of these counters are respectively connected to input terminals I3 and I4 of the CPU 18. The CPU 18 is adapted to read the counts of the respective counter 15 and 16 by accepting pulses from its output O3 to the counters 15 and 16. Assuming that the counter 15 overflows with the pulses of n1 from the output O3 and that the counter 16 overflows with the pulses of n2, and if the counters 15 and 16 have a maximum counting number of N (from zero to overflow), it follows that the highest number of the counter 15 is N−n1 and that the highest number of the counter 16 is N−n2.

Further, input and output ports "IO1", "IO2", "IO3" and "IO4" of the CPU 18 are respectively connected to the reset releasing signals and the count stop signals of the counters 15 and 16. In this construction, the respective ports "IO1", "IO2", "IO3" and "IO4" change into the "low" level, when such reset releasing signals and count stop signals become "low". This is to prevent the counters 15 and 16 from being reset accidentally or inadvertently before the CPU 18 finishes its entire processing. For example, when the sensors 1 and 2 sense the subsequent swing of the golf club 24 before the CPU 18 completes a series of steps, the counters 15 and 16 are not brought to the state of restarting its counting process under way, and the golf swing analyzer displays the results of analysis without causing overflow of the counters 15 and 16. The CPU 18 returns all the ports to their initial states after finishing the entire calculation and after displaying the results on the indicator 19.

In practice, the circuit illustrated in FIG. 1 can be realized using commercially available circuit components known to those skilled in the art. Further it is possible to use such a CPU that has a counter function and if such is the case, no counters are required to be provided separately from and in addition to such CPU.

Obviously, many modifications and variations of the present invention are possible in the light of the above teachings. It is therefore to be understood that within the scope of the appended claims, the invention may be practiced otherwise than as specifically described.

What I claim is:

1. A golf swing analyzer comprising
a permanent magnet attached to the head of a golf club;
two magnetic sensors spaced apart from each other horizontally and in parallel relationship with an ideal swing direction of the golf club;
first detecting means for receiving outputs signals from said two sensors for detecting whether the output signals are larger or smaller than a reference potential level Vo plus a predetermined value;
second detecting means adapted to receive output signals from said two sensors for detecting whether the output signals are larger or smaller than a reference potential level Vo minus said predetermined value;
first counter adapted to receive pulse signals response to the detected output signals that are equal to "Vo+said predetermined value" level in order to measure at time interval T1 indicative of the swing motion of the golf club between the two sensors;
second counter adapted to receive pulse signals responsive to the detected output signals that are equal to "Vo−said predetermined value" level in order to measure a time interval T2 indicative of the swing motion of the golf club between the two sensors; and
a calculating means comprised of a central processing unit for calculating the swing speed of the golf club and the deviation of the swing direction of the golf club from its desired direction based on T1 and T2, wherein the swing speed is calculated by said calculating means by dividing a distance between the first and second sensors by (T1+T2)/2 and wherein the deviation is calculated by the difference between T1 and T2.

2. A golf swing analyzer according to claim 1, wherein the distance between the two sensors is not shorter than 3 cm and not longer than 12 cm.

3. A golf swing analyzer according to claim 1, wherein the central processing unit further comprises:
a comparing means for comparing T1 and T2 to find the deviation of the swing of the golf club from its desired and regular direction.

4. A golf swing analyzer according to claim 3, wherein two sensors are provided and wherein the distance between the sensors is not shorter than 3 cm and not longer than 12 cm.

* * * * *